(12) United States Patent
Brown

(10) Patent No.: US 6,676,094 B1
(45) Date of Patent: Jan. 13, 2004

(54) SUPPORT BRACKET AND METHOD

(75) Inventor: Richard W. Brown, 5805 S. Ensenada St., Aurora, CO (US) 80015

(73) Assignee: Richard W. Brown, Aurora, CO (US)

( * ) Notice: Subject to any disclaimer, the term of this patent is extended or adjusted under 35 U.S.C. 154(b) by 0 days.

(21) Appl. No.: 10/299,400

(22) Filed: Nov. 18, 2002

(51) Int. Cl.[7] ............................................. F21V 35/00
(52) U.S. Cl. ...................................... 248/214; 248/539
(58) Field of Search ........................... 248/214, 229.12, 248/229.22, 228.3, 539, 541; 135/16

(56) References Cited

U.S. PATENT DOCUMENTS

| | | | | |
|---|---|---|---|---|
| 5,173,181 A | * | 12/1992 | McFarland | 210/169 |
| 5,636,649 A | * | 6/1997 | Horvath | 135/16 |
| 5,857,658 A | * | 1/1999 | Niemiec | 248/534 |
| 6,168,125 B1 | * | 1/2001 | Winger et al. | 248/228.3 |
| 6,325,084 B1 | * | 12/2001 | Cohen | 135/16 |

* cited by examiner

Primary Examiner—Ramon O. Ramirez
(74) Attorney, Agent, or Firm—Townsend and Townsend and Crew LLP

(57) ABSTRACT

A deck appurtenance includes an item to be supported, a support pole supporting the item, and a support bracket. The support bracket includes a first end detachably coupled to a midline portion of the support pole, a second end detachably coupled to a component of a deck rail, and a body connecting the first end to the second end.

18 Claims, 3 Drawing Sheets

SUPPORT BRACKET AND METHOD

BACKGROUND OF THE INVENTION

The present invention generally relates to outdoor furniture sets. The present invention relates more specifically to a support mechanism for an umbrella, associated with an outdoor furniture set.

Deck or patio furniture is ubiquitous in modern suburbia. Often, an outdoor furniture set includes a table, four or more chairs, and an umbrella to provide shade from the sun. Well known outdoor furniture sets are designed such that the table includes an opening in the center for receiving the umbrella and partially supporting the umbrella in combination with a base that sits below the table. In this way, the umbrella provides shade to the table area when the sun is positioned generally high above the horizon. However, such arrangements are not functional for shading the table area when the sun is low on the horizon because the sun shines under the umbrella.

Prior art solutions have attempted to address this limitation by adapting the umbrella pole with a hinge to allow the umbrella to articulate toward the sun and provide additional shade when the sun is closer to the horizon. This solution, however, does not fully address the problem. In certain relationships among the sun, the umbrella, and the table area, the table area is not shaded because the sun still shines below the umbrella. Further, when the umbrella is articulated, it often interferes with those using the furniture. In short, present arrangements that confine the umbrella to a fixed location in the center of the table limit the effectiveness of the umbrella to times when the sun is higher above the horizon. Thus, an improved solution is needed for providing shade to the users of outdoor furniture when the sun is low on the horizon.

BRIEF SUMMARY OF THE INVENTION

Embodiments of the present invention thus provide a deck appurtenance, including an item to be supported, a support pole supporting the item, and a support bracket. The support bracket includes a first end detachably coupled to a midline portion of the support pole, a second end detachably coupled to a component of a deck rail, and a body connecting the first end to the second end. The item to be supported may include a "Tiki" torch, lantern, umbrella or light. The support pole may be hinged. The support pole may be oriented generally vertically. The support pole may be supported at a first end by a base. The first end may define a generally circular socket configured to receive the support pole. The first end may further define an opening into the socket. The deck appurtenance may include a grommet displaced generally concentric with the socket. The second end may include an attachment plate configured for attachment to the component of the deck rail and a fastener that rotationally couples the body to the attachment plate. The body may be configured to rotate, with respect to the attachment plate, between at least an operating position and a storage position. The deck appurtenance may include positioning detents adjacent the attachment plate that define the operating position and the storage position. The component of the deck rail may include a handrail, post or stile.

In other embodiments, an umbrella support bracket includes a first end operable to engage a generally vertically oriented umbrella support pole along a midline portion, a second end operable to engage a component of a deck rail, and a body that connects the first end to the second end. The first end may define a generally circular socket configured to receive the support pole. The support bracket may include a grommet displaced generally concentric with the socket. The second end may include an attachment plate configured for attachment to the component of the deck rail and a fastener that rotationally couples the body to the attachment plate. The body may be configured to rotate, with respect to the attachment plate, between at least an operating position and a storage position.

In still other embodiments, an umbrella support bracket includes first means for engaging an umbrella support pole along a midline portion, second means for engaging a component of a deck rail, and third means for connecting the first means to the second means.

A method of using a support bracket to support a deck appurtenance includes engaging a support pole along a midline portion with a first end of the support bracket. The support pole supports the deck appurtenance. The method further includes engaging a component of a deck rail with a second end of the support bracket. The deck appurtenance may include a "Tiki" torch, lantern, umbrella or light. The component of the deck rail may include a handrail, post or stile.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

The present invention provides a support bracket for supporting an umbrella or other item. While the description herein generally demonstrates the use of the present invention with reference to an umbrella, it is to be understood that the present invention is not limited to use with umbrellas. Other deck appurtenances, as will be described, may be used advantageously in combination with the present invention.

Umbrellas included in presently-available outdoor furniture sets are generally designed to be supported by a base in combination with a hole through a table. Thus, the functional location of the umbrella is confined to the center of the table. If the umbrella is moved away from the table, it is unstable, especially in windy conditions, because the base alone cannot support the umbrella. According to the present invention, however, the umbrella may be supported apart from the table, thus more effectively shading the table occupants when the sun is positioned low on the horizon.

Outdoor furniture is often used on outdoor decks. Many decks, especially those elevated from the surrounding yard, are equipped with rails to prevent falls from the deck. According to the present invention, the deck rail, in combination with a support bracket, may support an umbrella away from the table, thereby more effectively shading the table area when the sun is low on the horizon. The general use of the present invention is illustrated in FIG. 1.

Figure 1:
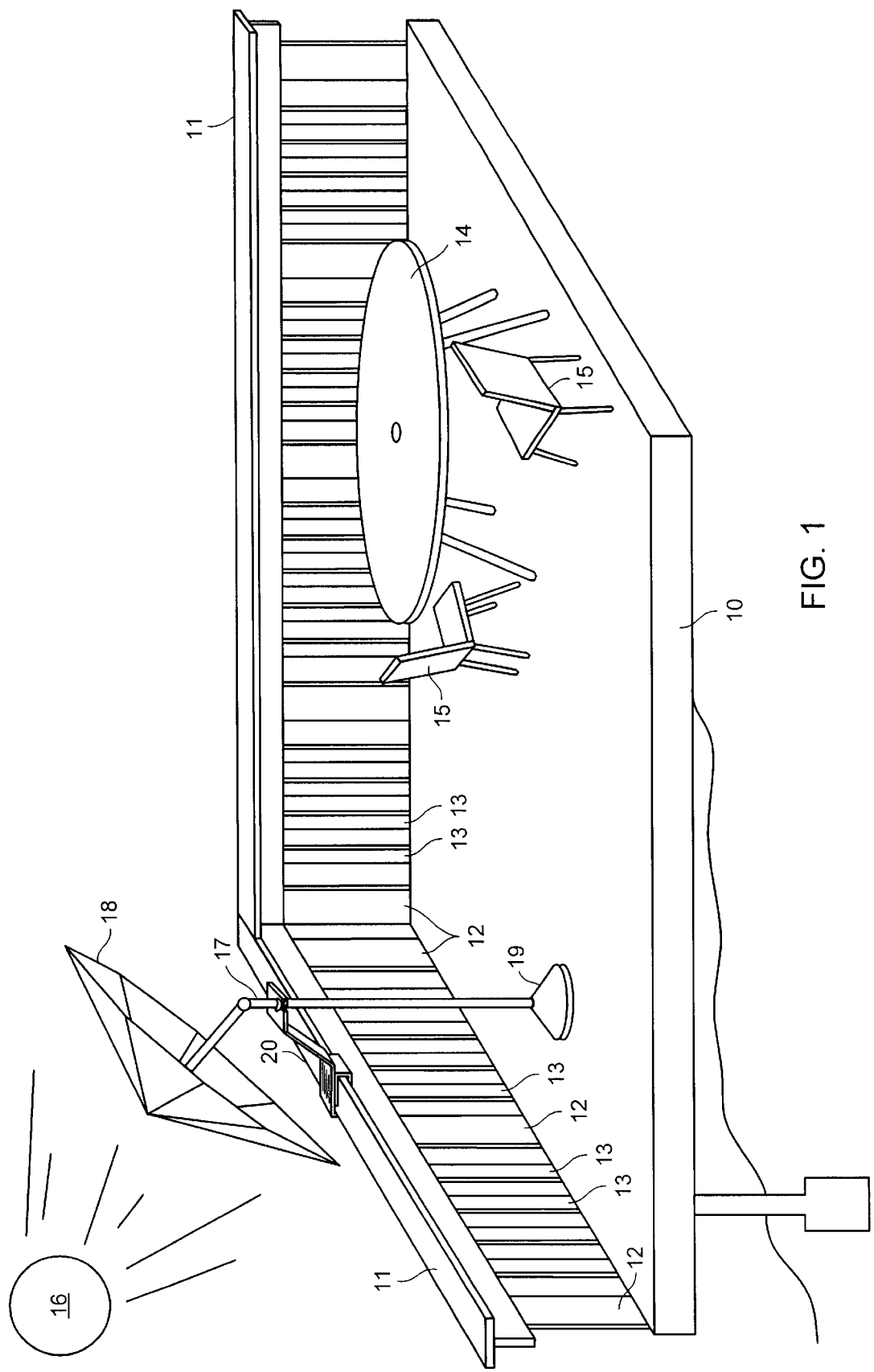
FIG. 1 is an elevation view of an outdoor deck illustrating the use of one embodiment of a support bracket according to the present invention.

FIG. 1 is an elevation of an outdoor deck 10 illustrating one embodiment of the present invention. The deck 10 includes a handrail 11, posts 12, and stiles 13 between the posts 12. An outdoor furniture set, including a table 14 and chairs 15, is arranged on the deck 10. The sun 16 is low on the horizon. Thus, an umbrella 18, support pole 17, and base 19 are positioned away from table 14 to provide shade to the table 14 and chairs 15, and people using them. In order to stabilize the umbrella 18, a support bracket 20 according to the present invention is positioned between the deck 10 and the support pole 17.

As will be explained in more detail hereinafter, the support bracket 20 may be attached to a component of a deck rail, such as a hand rail, in some embodiments (e.g., as shown in FIG. 1) or attached to the stiles or posts supporting the rail in other embodiments. This arrangement provides a stable anchor for the umbrella 18, essentially replacing the function of the table 14 in providing support to the umbrella. While one end of the support bracket 20 is adapted for attachment to the deck rail, the other end is adapted for attachment to a midline portion of the support pole 17 of the umbrella 18. In some embodiments, it may not be necessary to use the support bracket 20 in combination with the base 19 to support the umbrella 18. Simply the support bracket 20 alone may provide sufficient support.

According to the present invention, the support bracket may be used with different types of umbrellas. For example, the support bracket may be used with rigid pole umbrellas or umbrellas having a hinge that allows the umbrella to articulate. The umbrella may be a collapsible model, as is commonly known; however, a non-collapsible model also may be used. Further, the support bracket of the present invention may be used in combination with an umbrella to shade anyone or anything. The present invention may be used to support an umbrella for purposes other than shading as well. Further still, the present invention also may be used to support other deck appurtenances such as lights, "Tiki" torches, lanterns, and the like. Many other examples are possible. Thus, the specific examples used herein should not be considered limiting as they are provided for illustrative purposes.

Figure 2A:
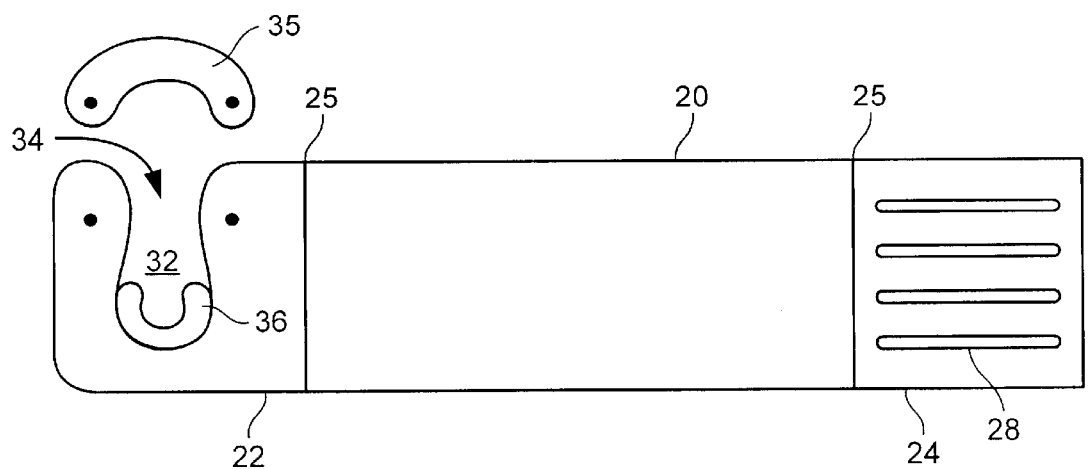
FIGS. 2A and B are top and side views, respectively, of a first embodiment of a support bracket according to the present invention.
Figure 2B:
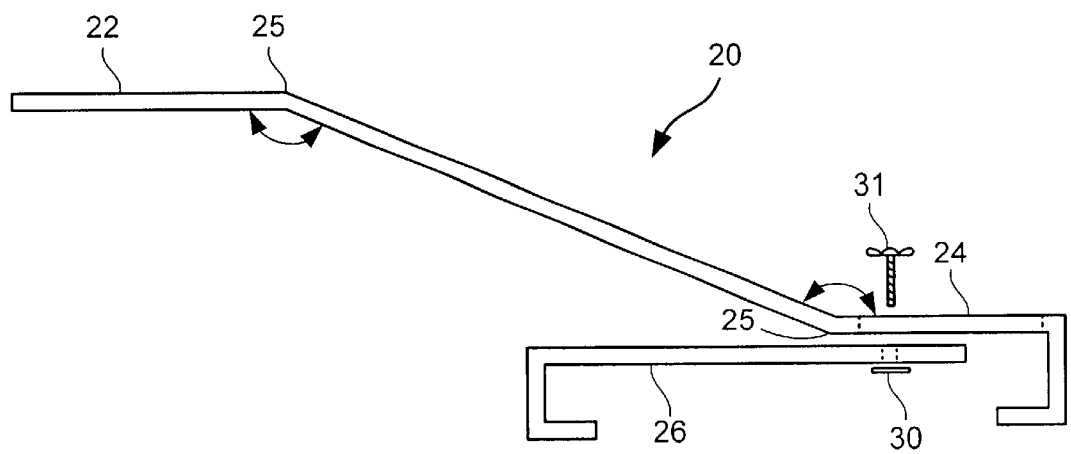

Referring now to FIGS. 2A and B, top and side views illustrate a first embodiment of a support bracket 20. The embodimnent of the support bracket illustrated in FIGS. 2A and B is designed for engaging a midline portion of a support pole of an item, such as an umbrella, at a first end 22 and a deck at a second end 24. In a specific embodiment, the support bracket 20 is sheet metal having a thickness of one sixteenth of an inch. However, in other embodiments, the support bracket may be fiberglass, plexiglass, wood, plastic, or other suitable material. Along the length of the support bracket 20, bends 25 may be positioned and sized to properly position the first end 22 vertically with respect to the second end 24.

The second end 24 may be configured for adjustment to engage deck rails of various sizes, for example 2×4 or 2×6. Other sizes are possible. In the example pictured in FIGS. 2A and B, adjustment is provided by coupling an opposing adjustment member 26 to the second end 24 of the support bracket 20. In this example, both the second end 24 and the adjustment member 26 are shaped to engage opposing sides of a deck rail. Adjustment holes 28 may be provided in either or both of the second end 24, as shown, and/or the adjustment member 26 to provide adjustability. For example, bolts, screws, or other fastener(s) 30 may be positioned to engage both the second end 24 of the support bracket 20 and the adjustment member 26. One or more nuts 31, such as a wing nuts, may be used to provide a friction lock between the second end 24 and the adjustment member 26 when the two are positioned so as to engage a deck rail. Wing nuts or other hand-operated fasteners are particularly advantageous in that such fasteners provide quick readjustment and/or relocation of the support bracket 20 and do not require tools in most cases. In such embodiments, the fastener(s) 30 may be, for example, one or more flat-head bolts fixedly attached to the adjustment member 26. The fastener(s) 30 protrude through the adjustment holes 28 and engage the nut 31. In some embodiments, a combination of fasteners may be used. For example, one or more nuts may be used in combination with one or more rivets. In such examples, the one or more rivets may advantageously couple the second end 24 to the adjustment member 26, so that the parts are maintained together, yet allow for adjustment via other fasteners.

In other embodiments, the second end 24 and the adjustment member 26 may be attached via an over-center lock (not shown), for example, having a lever that squeezes the two parts together around the deck rail and locks into place when a certain degree of pressure is exerted on the rail. Other examples are possible. In other embodiments, the second end 24 may be shaped to engage deck rails of a particular width and/or thickness, or the second end 24 may be adapted for rigid, semi-permanent attachment to the deck rail. For example, nails, screws, bolts, other well-known fasteners, and the like may be used to fasten the second end 24 to the deck rail.

The first end 22 of the support, bracket 20 includes a socket 32 for engaging the support member of an umbrella, torch, light, or other item. The socket 32 may be closed, such that the item to be supported is inserted perpendicularly through the socket 32. In other embodiments, the socket may be open, as shown in FIG. 2A, such that the item to be supported may be inserted laterally though an opening 34 into the socket 32. In such cases the support bracket may include a locking member 35 that fits over the opening 34 once the item being supported is in place. In other embodiments, the socket may be equipped with a grommet 36, such as a rubber gasket, that provides a friction lock between the support bracket 20 and the item to be supported. Many other arrangements are possible.

Figure 3:
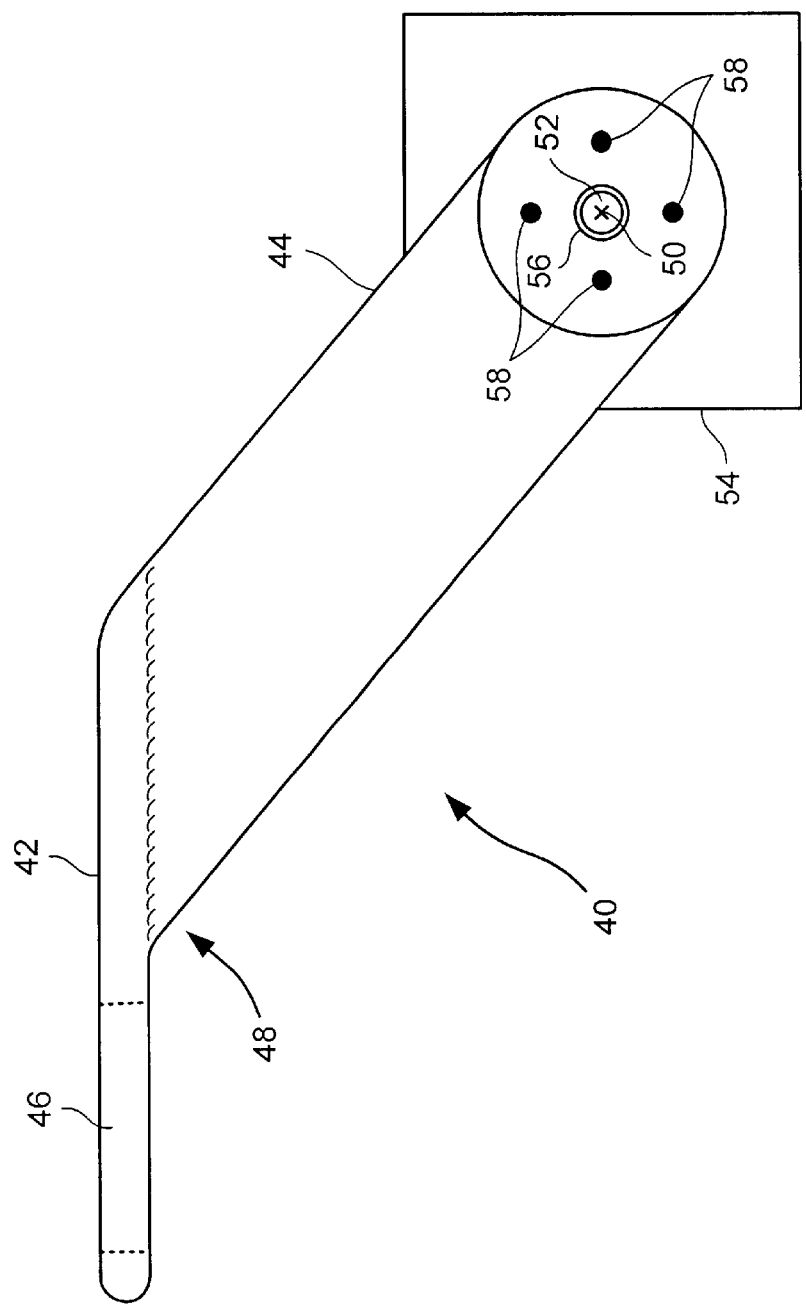
FIG. 3 is a side view of a second embodiment of a support bracket according to the present invention.

Referring now to FIG. 3, a second embodiment of a support bracket 40 will be described. The support bracket 40 is operable to support an outdoor item, as previously described with respect to FIGS. 2A and B. However, the support bracket 40 of the present, embodiment is further operable for semi-permanent attachment to posts, stiles, or rails of a deck or other structure. The support bracket 40 is further operable to articulate between an operating position and a storage position, as will be described.

The support bracket 40 includes a first end 42 for engaging a midline portion of a support pole, and a second end 44 that attaches to a structural support. The first end 42 includes a socket 46 that may include an opening (not shown) for receiving the outdoor item and/or a grommet (not shown) for providing a friction coupling with the item to be supported, as previously described with respect to the embodiment of FIGS. 2A and B.

In some embodiments, the support bracket is one-sixteenth inch sheet metal; however, other materials may be used, as previously described. Along its length, the support bracket 40 may include a twist 48, such as a 90-degree twist, thus enabling the support bracket 40 to support an item arranged generally parallel to the structure to which the second end 44 is attached.

The second end 44 of the support bracket 40 may be configured for rotation about an axis 50. A fastener 52 at the axis 50 may attach the second end 44 of the support arm 40 to an attachment plate 54. The fastener 52 may be a bolt, a rivet, a screw, or other suitable fastener, that allows the support arm 40 to rotate with respect to the attachment plate 54. In a specific embodiment, the attachment plate 54 is secured to the second end 44 with a threaded fastener and a wing nut. In some embodiments, a tensioning device 56, such as a spring or spring washer, may be used to produce friction force between the second end 44 and the attachment plate 54 for holding the support bracket in a desired position. This allows the support arm 40 to rotate when force is applied in the correct direction, yet retain its position in the absence of sufficient force to cause rotation. In some embodiments, positioning detents 58 may provide tactile feedback to the operator that allows the operator to sense when the support arm is in either an operating position or a storage position. The detents 58 also provide additional stabilization force that causes the bracket to retain a desired position.

The attachment plate may be secured to the support structure using bolts, screws, nails, straps, wires, and the like. Many other examples are possible. The support structure may be a part of a deck, such as a rail, a post, a stile, or the like, or other suitable structure.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to fabricate parts from materials described herein and assemble those parts into a working embodiment of the present invention. Accordingly, the above description should not be taken as limiting the scope of the invention, which is defined in the following claims.

What is claimed is:

1. A deck appurtenance, comprising:
   an item to be supported and a support pole supporting the item, wherein the support pole comprises a top end that engages the item, a bottom end, and a midline portion connecting the top end to the bottom end; and
   a support bracket comprising:
      a first end detachably coupled to the midline portion of the support pole, wherein the first end defines a generally circular socket and a lateral opening into the socket configured to laterally receive the midline portion of the support pole;
      a second end detachably coupled to a component of a deck rail; and
      a body connecting the first end to the second end.

2. The deck appurtenance of claim 1, wherein the item to be supported comprises a selection from a group consisting of "Tiki" torch, lantern, umbrella and light.

3. The deck appurtenance of claim 1, wherein the support pole is hinged.

4. The deck appurtenance of claim 1, wherein the support pole is oriented generally vertically.

5. The deck appurtenance of claim 1, wherein the support pole is supported at bottom end by a base, and wherein the socket is configured to laterally receive the midline portion of the support pole while the top end is engaged to the item and the bottom end is supported by the base.

6. The deck appurtenance of claim 1, further comprising a grommet displaced generally concentric with the socket.

7. The deck appurtenance of claim 1, wherein the second end comprises:
   an attachment plate configured for attachment to the component of the deck rail; and
   a fastener that rotationally couples the body to the attachment plate.

8. The deck appurtenance of claim 7, wherein the body is configured to rotate, with respect to the attachment plate, between at least an operating position and a storage position.

9. The deck appurtenance of claim 8, further comprising positioning detents adjacent the attachment plate that define the operating position and the storage position.

10. The deck appurtenance of claim 1, wherein the component of the deck rail comprises a selection from a group consisting of handrail, post and stile.

11. An umbrella support bracket, comprising:
   a first end, which defines a generally circular socket and a lateral opening there into, wherein the first end is operable to laterally engage a generally vertically oriented umbrella support pole along a midline portion;
   a second end operable to engage a component of a deck rail; and
   a body that connects the first end to the second end.

12. The umbrella support bracket of claim 11, wherein the support bracket further comprises a grommet displaced generally concentric with the socket.

13. The umbrella support bracket of claim 11, wherein the second end comprises:
   an attachment plate configured for attachment to the component of the deck rail; and
   a fastener that rotationally couples the body to the attachment plate.

14. The umbrella support bracket of claim 11, wherein the body is configured to rotate, with respect to the attachment plate, between at least an operating position and a storage position.

15. An umbrella support bracket, comprising:
   first means for laterally engaging an umbrella support pole along a midline portion;
   second means for engaging a component of a deck rail; and
   third means for connecting the first means to the second means.

16. A method of using a support bracket to support a deck appurtenance, comprising:
   with a first end of the support bracket, laterally engaging a support pole along a midline portion, wherein the support pole supports the deck appurtenance; and
   with a second end of the support bracket, engaging a component of a deck rail.

17. The method of claim 16 wherein the deck appurtenance comprises a selection from the group consisting of "Tiki" torch, lantern, umbrella and light.

18. The method of claim 16 wherein the component of the deck rail comprises a selection from a group consisting of handrail, post and stile.

* * * * *